G. L. MERRELL & O. F. SOULE.
Apparatus and Process for Preserving and Canning Green Corn.
No. 8,351. Reissued July 23, 1878.
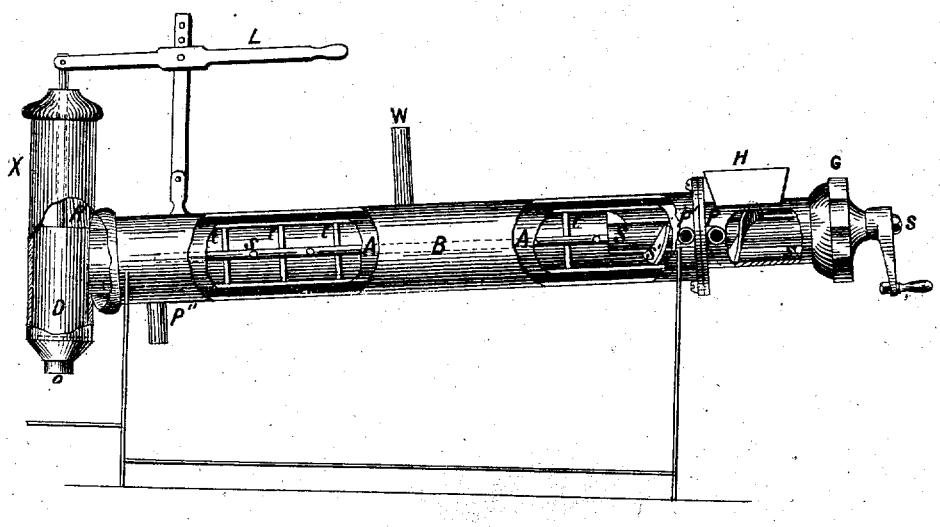
Attests
John Dolley Jr
Jno. L. Underwood
Inventors
G. Lewis Merrill
Oscar F. Soule
By their Attorneys
W. C. Grawroy,
J. Bonsall Taylor

UNITED STATES PATENT OFFICE.

G. LEWIS MERRELL AND OSCAR F. SOULE, OF SYRACUSE, NEW YORK.

IMPROVEMENT IN APPARATUS AND PROCESSES FOR PRESERVING AND CANNING GREEN CORN.

Specification forming part of Letters Patent No. 145,581, dated December 16, 1873; Reissue No. 5,797, dated March 17, 1874; Reissue No. 8,351, dated July 23, 1878; application filed July 17, 1878.

*To all whom it may concern:*

Be it known that we, G. LEWIS MERRELL and OSCAR F. SOULE, of the city of Syracuse, in the county of Onondaga and State of New York, have invented a new and Improved Method of Preserving Green Corn and other Vegetables, and the apparatus by which it is done; and we do hereby declare that the following is a full, clear, and exact description of the same, reference being had to the annexed drawing, in which the apparatus is shown partly sectional and partly perspective, and which forms part of this specification.

The method consists in first removing the corn from the cob in any ordinary manner, and subjecting it to a cooking action in a cooking-chamber so arranged that there will be nearly a continuous flow of fresh corn or vegetable into the chamber and an exit of cooked corn from it.

Steam is applied directly into the cooking-chamber at a point near where the corn is fed, and it is made to permeate all parts of the chamber, the effect of which is to first fix the juices of the corn, so as to retain all its desirable properties, liberate the gases, and then rapidly carry forward the process of cooking, which may be completed in this manner.

In order to carry the cooking forward more rapidly, we surround, or nearly surround, the cooking-chamber with a steam-chamber, so that the cooking-chamber may be kept heated in that manner also, and in the cooking-chamber we provide the necessary means for carrying the material through the chamber and stirring it as it passes. The time for cooking will be determined by the judgment of the operator.

The cooking-chamber is so arranged that the steam let into the same will, as far as possible, be carried forward with the corn in the chamber, and the cooking-chamber should not allow the steam to escape more than is absolutely necessary.

At the place of exit for the cooked corn an apparatus is provided by which the corn is forced into the mouth of the can in its heated state with the least possible exposure to the air. The cans are then sealed up in the ordinary manner.

This method will fix the juices and completely cook the corn, so that a very short heating of the can will be all that will be necessary for its preservation. The cans will swell but little when so heated, and will quickly return to their natural position.

We are aware that it is not new to partly or wholly cook the food after placing it in the cans.

In cooking other vegetables care must be taken not to injure them by the stirring apparatus, and where they are liable to be injured by it the stirring apparatus should be removed.

In the apparatus which we employ, A is a cylindrical cooking-chamber, about ten or twelve feet long, more or less, and about five or six inches in diameter, more or less. H is a hopper, of convenient size, in the proper location for feeding the corn into the cooking-chamber.

Inside the cooking-chamber we provide a shaft, S, to be operated at the feeding end by power or by the hands of the operator, passing through a head, G, to be fitted upon or into the feeding end of the cooking-chamber, and as tight as may be, so as to prevent the escape of steam or juices from the corn.

Upon the shaft S, at the feeding end of the cooking-chamber, we provide an ordinary spiral, S′, about two or three feet long, which fits as snugly as may be into the cooking-chamber, to allow of easy operation.

The remainder of the shaft S is provided with teeth *t t t*, as many as may be necessary to keep the corn well stirred in that part of the cooking-chamber.

The spiral S′ should turn at least once with the shaft S before coming to the point where the pipe P lets the steam into the cooking-chamber, so that it will tend to prevent exit of the steam through the hopper H.

B is another cylinder, of about an inch more diameter than the cooking-chamber A, made to surround it steam-tight, so that there will be a steam-chamber between the two cylinders of about half an inch space. P′ is the pipe for letting the steam into this steam-chamber, also provided with necessary feeding and exhausting valves. P″ is the exhaust-pipe, also provided with a valve.

Any ordinary steam-gage, W, may be applied to the cylinder B, so as to regulate the pressure of steam, which should be about fifteen pounds to the square inch, more or less.

The following is a description of a convenient form of apparatus provided at the place of exit of the cooked corn from the cooking-chamber, and by which such corn is forced into the mouth of the can.

*x* is a transverse cylinder, with a spout, *o*, to be inserted into the mouth of the can, and with a plunger, R, having a head, D, of sufficient length to cover the end of the cooking-cylinder and keep the corn back until it is necessary to fill a can. The plunger R is operated by an ordinary lever, L.

We claim that corn preserved by the above process will be of better quality than when cooked in any ordinary manner or when wholly cooked in cans, because when wholly cooked in cans the gases are kept with the juices while the cooking is going on, and the corn and juices are injured thereby, while by our method and apparatus the steam let into the cooking-chamber fixes and changes the juices at once, and the gases immediately pass off, leaving the corn of a natural color and flavor.

Another advantage in favor of our process is the rapid manner in which the corn can be put up.

What we claim as our invention, and desire to secure by Letters Patent of the United States, is—

1. The process of preserving and canning corn or other vegetables, which consists in cooking the same by steam while in transit through a cooking-chamber, and introducing the same by a suitable device directly into cans with the least possible exposure to the air.

2. In an apparatus for both preserving and canning corn, a cooking-chamber having devices to produce a flow of fresh corn or other vegetable through the chamber and cause an exit of cooked food from it, in combination with a canning device at the exit end of the cooking-chamber for introducing the cooked material into the can.

3. The process of preserving and canning green corn or other vegetable, which consists in cooking the same by steam while in transit through a cooking-chamber, introducing the same by a suitable device directly into cans with the least possible exposure to the air, and finally reheating the same in the sealed cans.

G. LEWIS MERRELL. [L. S.]
OSCAR F. SOULE. [L. S.]

Witnesses:

WATERMAN J. BRADLEY,
CALVIN S. BUNNELL.